UNITED STATES PATENT OFFICE.

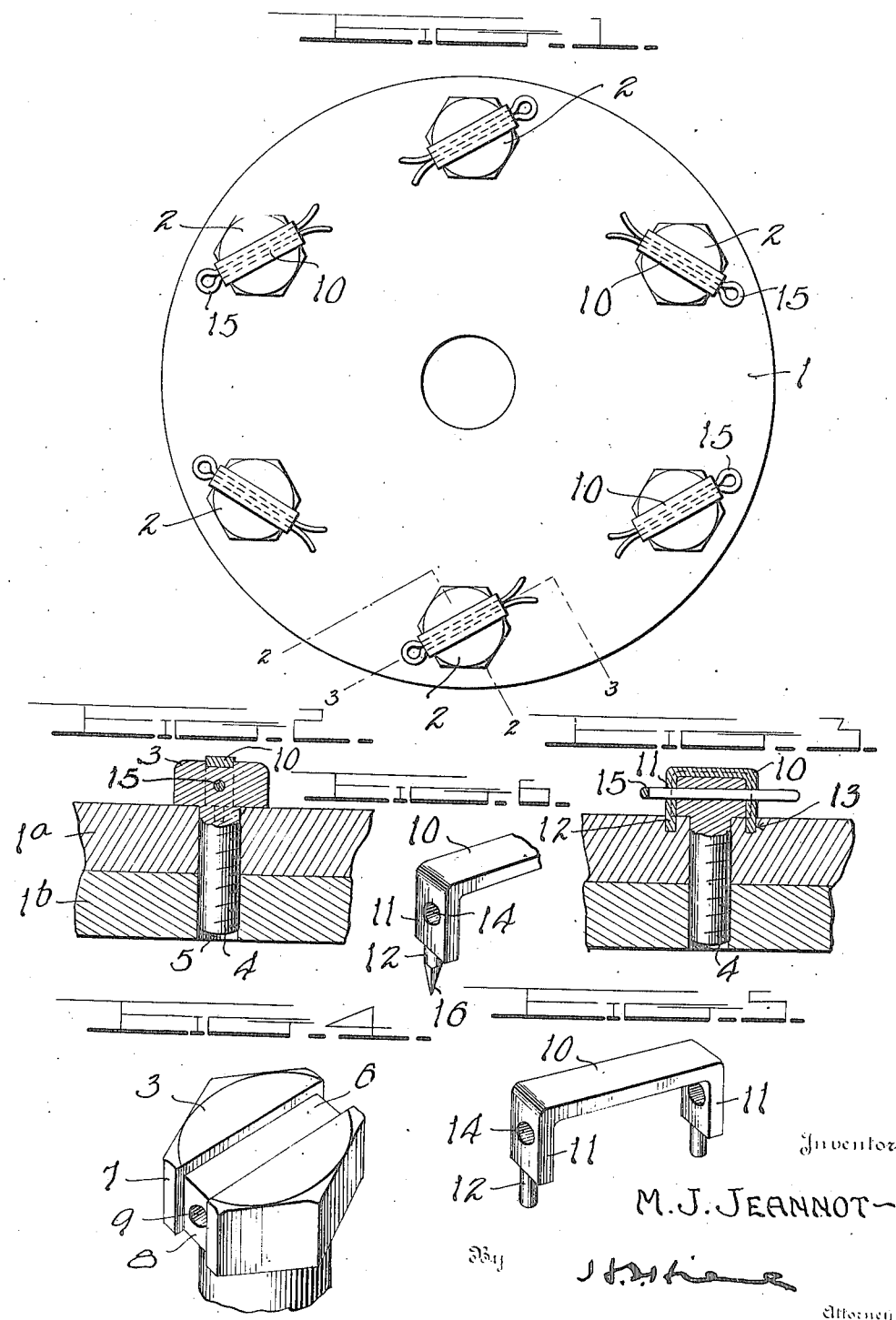

MITCHELL J. JEANNOT, OF GARDEN VALLEY, IDAHO.

BOLT-LOCK.

1,166,220.  Specification of Letters Patent.  Patented Dec. 28, 1915.

Application filed August 6, 1915. Serial No. 43,911.

*To all whom it may concern:*

Be it known that I, MITCHELL J. JEANNOT, a citizen of the United States, residing at Garden Valley, in the county of Boise and State of Idaho, have invented certain new and useful Improvements in Bolt-Locks, of which the following is a specification.

The present invention relates to new and useful improvements in bolt locks, and has for its object to provide a device of this character which embodies novel features of construction whereby a bolt to which the invention is applied may be positively and effectually prevented from rotation even when subjected to violent vibrations.

Further objects of the invention are to provide a device of this character which is comparatively simple and inexpensive in its construction, which can be easily and quickly applied to the bolt, and which can be used repeatedly without deterioration.

With these and other objects in view, the invention consists in certain novel combinations and arrangements of the parts as will more fully appear as the description proceeds, the novel features thereof being pointed out in the appended claims.

For a full understanding of the invention reference is to be had to the following description and accompanying drawing in which:—

Figure 1 is a side elevation of a fly wheel, showing a bolt lock constructed in accordance with the invention as applied to the tap bolts which are utilized to hold the sections of the fly wheel together. Fig. 2 is a transverse sectional view taken on the line 2—2 of the Fig. 1. Fig. 3 is a similar view taken on the line 3—3 of Fig. 1. Fig. 4 is a detail perspective view of the head of one of the bolts. Fig. 5 is a detail perspective view of one form of locking member. Fig. 6 is a detail perspective view of a modified construction of the locking member, portions being broken away.

Corresponding and like parts are referred to in the following description and indicated in all the views of the drawing by the same reference characters.

For the purposes of illustration, the invention has been shown as applied to the bolts which are utilized to hold the sections of a fly wheel together, although it will be understood that the invention may be utilized in connection with other forms of bolts used for different purposes.

Referring to the drawing the numeral 1 designates a fly wheel of conventional construction, said fly wheel being composed of sections 1ª and 1ᵇ which are secured together by the tap bolts 2. Each of the bolts 2 comprises the usual head 3 and threaded shank 4, the said shank being screwed into a correspondingly threaded tap 5 formed in the sections of the fly wheel. The head of each of the bolts is provided on the top surface thereof with a transversely extending groove 6 which extends entirely across the head of the bolt and intersects the opposite sides 7 thereof. The opposite sides 7 of the bolt are provided with grooves 8 which have substantially the same width as the grooves 6 on the top surface of the bolt and form continuations thereof, the said grooves 8 extending the full height of the sides 7 of the head of the bolt. An opening 9 is provided in the head of the bolt at about midway of the height thereof, the said opening extending transversely across the head of the bolt parallel to the groove 6 in the top surface of the head thereof, and intersecting the grooves 8 in the opposite sides thereof. This opening 9 is adapted to receive a fastening member for the purpose of securing the locking member to the head of the bolt as is hereinafter described.

The locking member for the bolt consists of a strap 10 of metal of the same width as the grooves 6 and 8 in the head of the bolt, and adapted to fit snugly therein when the locking member is applied to the bolt.

The end portions 11 of the locking strap 10 are bent laterally at right angles to the main portion of the strap, the said end portions 11 being adapted to fit snugly within the grooves 8 in the opposite sides of the end of the bolt when the locking strap is applied thereto. The end portions 11 are provided with reduced extensions 12 which are adapted to fit within corresponding recesses 13 formed in the material to which the bolt is secured so as to prevent rotation of the bolt when the locking member is applied thereto. The extensions 11 are further provided with openings 14 which correspond to the opening 9 in the head of the bolt and are brought into alinement therewith when the locking strap is applied to the head of the bolt, a cotter pin or like fastening member being inserted through the openings 14 in the end portions of the strap and the opening 9 in the bolt head, so as to secure the locking strap to the bolt head and prevent disengagement thereof from the head of the bolt after the same has been secured in position and the locking strap applied thereto.

When applying the bolt lock to a bolt which is secured to some hard material such as metal, it is advisable to first screw the bolt tightly into position and then form the openings 13 in the material to which the bolt is secured at the ends of the grooves in the head of the bolt. After the openings 13 have been formed the locking strap 10 is fitted within the grooves 6 and 8 in the head of the bolt and the extensions 12 fitted within the openings or recesses 13 in the material to which the bolt is secured. The cotter pin or like fastening member 15 is then inserted into the openings 14 in the locking strap at one side of the bolt head and then forced through the opening 9 in the bolt head outwardly through the opening 14 in the locking strap at the opposite side of the bolt, after which the free ends of the cotter pin may be bent outwardly from each other in the usual manner to prevent the same from disengaging itself from the bolt. In order to remove the lock from the bolt it is merely necessary to remove the cotter pin 15 from the openings in the locking strap and the bolt head, after which the extensions 12 on the locking strap may be disengaged from the openings 13 by pulling upwardly on the locking strap 10. One convenient way of raising the locking strap from engagement with the bolt head is to insert the point of the cotter pin in one of the openings 14 in the locking strap 10 and then pull upwardly on the cotter pin, the said cotter pin serving as an effective means for engaging the locking strap to remove it from the bolt head. After the bolt has been once secured in position and the recesses 13 formed in the material to which the bolt is secured, the bolt may be removed and replaced as many times as is desired, the locking strap and the original recesses 13 being used each time the bolt is replaced in position, it being unnecessary to form a new set of recesses each time it is desired to lock the bolt in position. It will be obvious that no injury is done to the locking strap either in applying or removing the same from the bolt, and that therefore the said locking strap may be used repeatedly without deterioration thereof.

The locking strap above described may be utilized when the bolt is secured to either hard material such as metal or comparatively soft material such as wood, although in order to obviate the necessity of boring the recesses 13 when the bolt is secured to a wood foundation a modified construction of the locking strap, such as is shown by Fig. 6, may be utilized. The construction of this strap is substantially the same as that above described, with the exception that the lower extremities of the extensions 12 are sharpened or pointed as at 16 so as to readily penetrate the wood when pressure is applied to the top of the locking strap. In applying this locking member to a bolt which is secured to a wood foundation the bolt should first be secured in position and the end portions 14 of the locking strap fitted within the grooves 8 in the opposite sides of the bolt head. A blow or pressure is then exerted upon the top of the locking strap, the said blow upon the strap forcing the pointed ends of the extensions 12 into the wood and at the same time snugly seating the main portion of the locking strap 10 within the grooves 6 in the top of the bolt head. The cotter pin or like fastening member 15 is then applied to the locking strap and bolt head in the same manner as previously described, and the locking strap may be disengaged from the bolt head in substantially the same manner as that previously described. It will thus be seen that this modified construction of the locking strap is very much more desirable when the bolt to be locked is secured to a wood foundation since the necessity of boring the recesses 13, which involves considerable time, is obviated.

From the above description it will be seen that very simple and effective means have been provided for positively preventing rotation of the bolt after it has been once secured in position, even when the bolt is subjected to violent vibrations, and that the said locking means may be used interchangeably and repeatedly upon various forms of bolts without injury thereto or deterioration thereof.

Having thus described the invention, what I claim as new and desire to secure by Letters Patent, is:—

1. A bolt lock including a bolt having a head thereon, said head being provided with a transverse groove in the top surface thereof and grooves in the opposite sides of the said head, said grooves forming continuations of the groove in the top surface of the head of the bolt, a locking strap having the main portion thereof fitted snugly within the groove in the top of the head of the bolt and the end portions thereof bent laterally at right angles to the main portion and fitted snugly with the grooves in the sides of the head of the bolt, the said end portions of the locking strap directly engaging the material to which the bolt is secured, and means for detachably securing the locking strap to the bolt head.

2. A bolt lock including a bolt having a head thereon, the said head being provided with a transverse groove in the top surface thereof, and grooves in the opposite sides of the head of the bolt, the said grooves forming continuations of the transverse grooves in the top surface of the bolt, recesses formed in the material to which the bolt is secured at the ends of the grooves in the head of the bolt, a locking strap having the opposite ends thereof bent laterally at right angles to the main portion of the strap and provided with reduced extensions, the main portion of the locking strap being adapted to fit snugly within the transverse groove in the top surface of the head of the bolt, while the end portions thereof are adapted to fit snugly within the grooves in the opposite sides of the head of the bolt, the reduced extensions at the ends of the strap being adapted to fit within the recesses formed in the material to which the bolt is secured, and means for detachably securing the locking strap to the bolt head.

3. A bolt lock including a bolt having a head thereon, the said head being provided with a transverse groove in the top surface thereof and similar grooves in the opposite sides thereof, the said grooves forming continuations of the transverse groove in the top surface in the head of the bolt, a transverse opening being also provided in the head of the bolt and extending across the bolt parallel to the transverse groove in the top surface thereof and intersecting grooves in the side of the head of the bolt, recesses formed in the material to which the bolt is secured at the ends of the grooves in the head of the bolt, a locking strap having the end portions thereof bent laterally at substantially right angles to the main portion thereof and formed with reduced extensions, openings corresponding to the opening in the head of the bolt being also provided in the end portions of the locking strap, the main portion of the locking strap being adapted to snugly fit within the transverse groove in the top surface of the bolt while the end portions thereof are adapted to fit within the grooves in the opposite sides of the bolt, the reduced extensions upon the ends of the strap being adapted to engage the recesses in the material to which the bolt is secured, and a cotter pin or like fastening member engaging the openings in the end portions of the locking strap and the opening in the head of the bolt to detachably secure the locking strap to the head of the bolt.

4. A bolt lock including a bolt having a head thereon, the said head being provided in the top surface thereof with a transverse groove and similar grooves in the opposite sides thereof, the said grooves forming continuations of the transverse groove in the top surface in the head of the bolt, a locking strap having the end portions thereof bent laterally at substantially right angles to the main portion thereof and provided with reduced sharp pointed extensions adapted to penetrate the material to which the bolt is secured, the main portion of the locking strap being adapted to fit snugly within the transverse groove at the top of the head of the bolt, while the end portions of the locking strap are adapted to fit within the grooves in the opposite sides of the head of the bolt, the reduced pointed extensions upon the end portions of the locking strap being forced into the material to which the bolt is secured when a blow or pressure is exerted upon the main portion of the locking strap, and means for detachably securing the locking strap to the head of the bolt.

5. A bolt lock including a bolt having a head thereon, the said head being provided with a transverse groove in the top surface thereof and similar grooves in the opposite sides thereof, the said grooves forming continuations of the transverse groove in the top surface in the head of the bolt, an opening being also provided in the head of the bolt, the said opening extending transversely across the head of the bolt parallel to the transverse groove in the top surface thereof and intersecting the grooves in the opposite sides in the head of the bolt, a locking strap having the end portions thereof bent laterally at substantially right angles to the main portion thereof and provided with reduced pointed extensions adapted to penetrate the material to which the bolt is secured when a blow or pressure is exerted upon the main portion of the locking strap, openings corresponding to the opening in the head of the bolt being also provided in the end portions of the locking strap, the main portion of the locking strap being adapted to snugly fit within the transverse groove within the head of the bolt, while the end portions thereof are adapted to fit within the grooves in the opposite sides of the end of the bolt, the reduced pointed extensions on the ends of the locking strap being forced into the material to which the bolt is secured when a pressure or blow is exerted upon the main portion of the locking strap and the strap brought into engagement with the grooves in the head of the bolt, and a cotter pin or like fastening member adapted to engage the openings in the end portions of the locking strap and the opening in the bolt head to detachably secure the locking strap to the bolt head.

In testimony whereof I affix my signature in the presence of two witnesses.

MITCHELL J. JEANNOT.

Witnesses:
  ERNEST CARPENTIER,
  FRANCIS J. CASTLE.